Oct. 8, 1935. A. H. FEIKERT 2,016,367
METHOD OF AND APPARATUS FOR HANDLING RUBBER ARTICLES
Filed Jan. 20, 1934 2 Sheets-Sheet 1
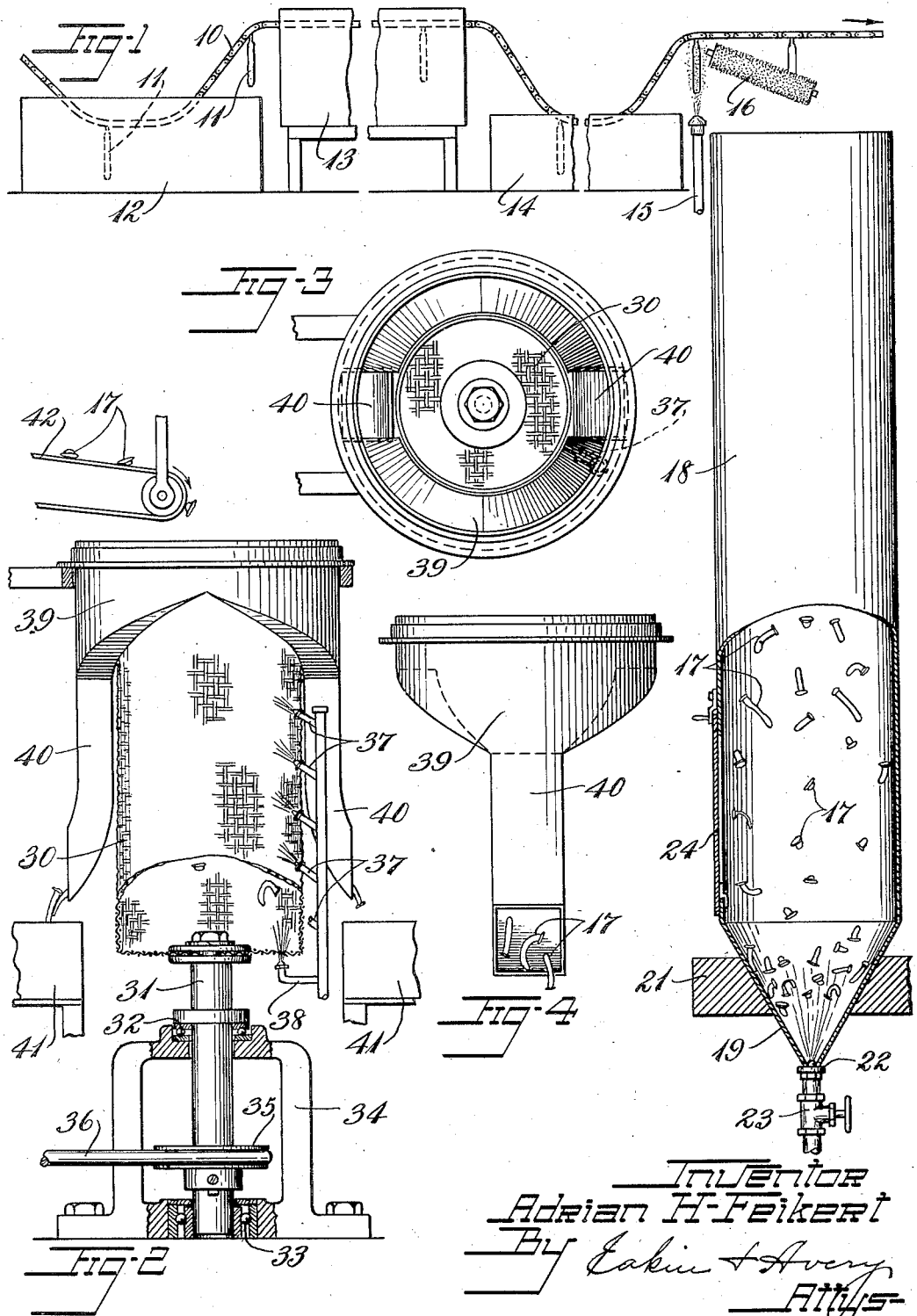

Oct. 8, 1935.  A. H. FEIKERT  2,016,367
METHOD OF AND APPARATUS FOR HANDLING RUBBER ARTICLES
Filed Jan. 20, 1934   2 Sheets-Sheet 2
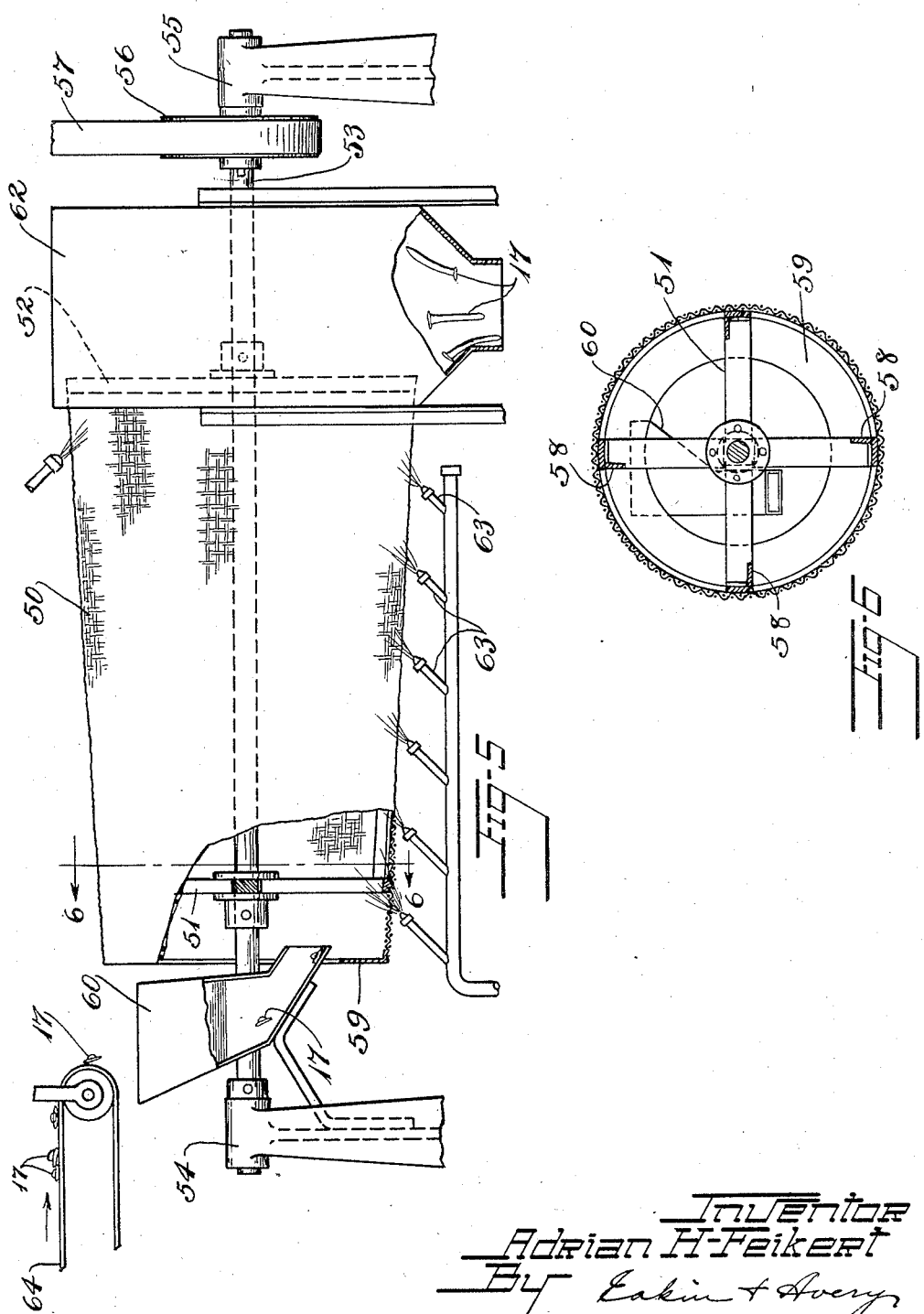

Patented Oct. 8, 1935

2,016,367

UNITED STATES PATENT OFFICE 2,016,367

METHOD OF AND APPARATUS FOR HANDLING RUBBER ARTICLES

Adrian H. Feikert, Akron, Ohio, assignor to American Anode, Inc., Akron, Ohio, a corporation of Delaware Application January 20, 1934, Serial No. 707,506

9 Claims. (Cl. 18—2)

This invention relates to the manufacture of rubber articles, and particularly to the manufacture of hollow tubular thin rubber articles closed at one end such as finger cots, certain types of toy balloons, and similar articles, which in the usual course of manufacture are compacted longitudinally and which must be extended to their normal uncompacted condition for inspection, testing and/or other purposes. This invention relates especially to improved procedure and apparatus for effecting the necessary extension or uncompacting of the articles.

In the manufacture of thin rubber articles of the type mentioned, tubular forms are immersed in a liquid dispersion of rubber such as latex or rubber cement, a thin coating of rubber is deposited upon the form, the rubber is dried, a bead is rolled at the open end of the rubber deposit, and the rubber usually is at least partially and preferably completely vulcanized while still on the form. Thereafter, the exposed surface of the article is dusted with adhesion-preventing material and the tubular article is rolled upon itself and off the form in a compact rolled condition. In order to inspect and test the article, it is necessary, however, to unroll it to its normal uncompacted condition, and although mechanical expedients have been proposed for accomplishing the unrolling, they have not proved satisfactory, and the operation still is performed manually. The manual unrolling of large numbers of such artices obviously entails considerable labor expense and also delays production since each separate article must be handled and unrolled individually before it can be inspected and tested. Accordingly, it is highly desirable that satisfactory non-manual means be devised for unrolling the articles, and it is the chief object of the present invention to provide simple, efficient, and economic procedure and apparatus for unrolling rolled rubber articles of the type described. It is a further object of the invention to provide for removing excess dusting material and for polishing the articles as they are unrolled. Other objects will be apparent from the following description of the invention.

When a thin tubular rubber article is rolled upon itself, the outer portion of the rolled wall is placed under tension, and as a result there is present in the rolled article an inherent tendency to unroll in order to relieve such tension, although the tendency usually is not sufficiently great in itself to cause the article actually to unroll. I have discovered and the present invention is directed primarily to means for subjecting the rolled articles to external unrolling forces which, augmenting the unrolling tendency inherent in the articles, are adequate to unroll the articles and to extend them to their normal unrolled or uncompacted condition.

In my invention, I take advantage of the fact that in the rolled article and even after it has been unrolled partially, substantially all of its weight is concentrated in a small rolled ring and that a thin membrane of relatively insignificant weight extends across the space within the ring. To unroll the articles, I present them repeatedly to a fairly high velocity stream of air, water or other fluid, which upon each successive presentation, propels the articles through space. In this motion through space, the rolled ring, because of its greater weight and consequent greater inertia lags behind and tends to retard the movement, while the force of the fluid stream is exerted primarily against the relatively greater area of the membrane across the ring. The effect of this is to cause the membrane, as it is propelled by the fluid stream, to drag the rolled ring through space which, as may readily be appreciated, will tend to unroll the article. This effect is further augmented by designing the container in which the articles are subjected to the fluid stream so that in their random movement under the influence of the stream the articles are repeatedly brought into frictional contact with the walls of the container as well as with each other and thus are subjected to further dragging or retarding forces which aid in effecting the unrolling. In some forms of my invention, I not only subject the articles to the action of a fluid stream, but also rotate or otherwise manipulate the container holding the articles to accentuate their random movement and to multiply the number of frictional encounters with the walls of the container and with each other.

The manner in which I carry out my invention will be described with reference to the accompanying drawings in which Fig. 1 is an elevation showing, in diagrammatic form, apparatus for making tubular rubber articles and for rolling the articles off the forms upon which they are made, and including a simple form of apparatus for unrolling the rolled articles.

Fig. 2 is a front elevation, partially broken away, showing a second form of apparatus for unrolling the articles.

Fig. 3 is a plan view of the apparatus of Fig. 2.

Fig. 4 is a side elevation of a portion of the apparatus of Fig. 2.

Fig. 5 is a side elevation, partially broken away, showing a third form of apparatus for unrolling the rolled articles.

Fig. 6 is a vertical section taken on line 6—6 of Fig. 5.

The apparatus of Fig. 1 comprises an endless chain conveyor 10 from which depend a number of tubular forms 11 having the shape of the articles to be made. The chain conveyor is arranged so that in its continuous travel the depending forms are caused first to be immersed in a liquid dispersion of rubber contained in a tank 12 to acquire a thin coating of the dispersion after which the coated forms travel through a drying chamber 13. After drying, the top of the thin rubber deposit is rolled upon itself for a short distance to form a bead, after which the coated form is carried by the chain through a vulcanizer which may be a tank of hot water 14. The vulcanized rubber, preferably while still wet from the vulcanizing, is dusted with adhesion-preventing material, for example, talcum powder, starch, or finely divided soapstone, which may be blown upon the rubber by a suitable dust spray 15. The form then passes between a pair of rotating brushes 16 disposed with their parallel axes disposed at an acute angle to the line of travel of the forms so that the brushes roll the rubber article 17 upon itself and off the form. The apparatus and procedure thus far described is well known in the art, and accordingly has not been described in great detail, and it is obvious that other known procedures and equivalent apparatus capable of accomplishing the same or similar results may be substituted therefor without deparing from the scope of the invention.

The first form of unrolling apparatus, illustrated in Fig. 1, comprises a vertically disposed, relatively long cylindrical chamber 18 open at its top and provided with a downwardly extending conical bottom 19 which may rest in a fitting aperture in a support 21. Directed upward into the chamber through a small opening at the apex of the conical bottom is provided a compressed air jet 22 controlled by a valve 23. A door 24 is provided in the wall of the container near the bottom thereof. In operation, a number of the rolled articles 17 having an aggregate volume considerably less than the volume of the container, are placed inside the container where they will of course fall by gravity into the conical bottom and over the air jet. The valve 23 is opened and a relatively high velocity forceful air stream is caused to issue from the jet 22, which serves to propel the rolled articles upward and to set the entire bulk thereof into a relatively violent state of random movement which brings them into frequent repeated frictional contacts with each other and with the walls of the container. Articles which fall down along the sides of the container out of the main air stream, are directed by the conical bottom to the jet and are again presented to the stream. After treatment for several minutes in this manner, the air stream may be stopped, whereupon the articles, which collect in the conical bottom, are found to be substantially completely unrolled as well as free of excess adhesion-preventing material. The unrolled articles may be removed through the door 24.

A second form of apparatus, illustrated in Figs. 2, 3 and 4, is designed for rotating the chamber in which the articles are subjected to the fluid stream, and comprises a vertical cylindrical basket 30, which may be made of heavy metal screen, clamped upon the upper end of a vertical shaft 31 for rotation of the basket about its vertical axis. The shaft is mounted for rotation upon suitable bearings 32, 33, carried by a supporting frame 34, and is driven by means of a pulley 35 and a belt 36. A series of air jets 37 are disposed in a vertical line along and slightly removed from the periphery of the basket, the jets being directed upward at a fairly steep angle and toward the interior of the basket, and a second jet or series of jets 38 is directed upward through the perforate bottom of the basket. Closely fitting about the top of the basket is provided a circular collecting chamber 39, the bottom of which slopes downward on opposite sides to a pair of similar chutes 40, 40, which lead to collecting boxes 41, 41.

In operation, the basket is rotated at a fairly high rate of speed say from 300 to 600 R. P. M., the air jets are turned on, and rolled thin rubber articles 17 are delivered to the basket by a conveyor 42. The compact articles, upon entering the basket, either are hurled centrifugally toward the sides of the rotating basket where they are presented repeatedly to the several air jets along the side, or they may fall to the bottom of the basket to be blown upward by the bottom jets, and then to be thrown against the sides, there to be presented to the air streams issuing from the side air jets. In any event, the effect is to maintain the mass of articles in the basket in a state of violent random movement bringing them into frequent contact with each other and with the basket walls and to present the articles repeatedly to the air streams. As the articles are progressively unrolled by this treatment, their mass becomes progressively less concentrated, and a progressively increasing area is presented to the air streams, so that the light weight membranous articles are more readily caught by the upwardly directed air streams which float the articles upward finally to the upper edge of the rotating basket from where they are thrown outward into the receiving chamber 39 and fall down the chutes 40 to the boxes 41, in an unrolled and polished condition free of excess dust.

A third form of apparatus illustrated in Figs. 5 and 6 comprises a frusto-conical drum 50, formed of coarse heavy wire screen, axially mounted by means of spiders 51, 52 at each end of the drum, upon a horizontal shaft 53, the shaft being journalled in supports 54, 55 and driven by means of a pulley 56 and belt 57. Several longitudinal angle bars 58, 58 or similar baffles are provided upon the inside of the drum. The smaller end of the drum is fitted with an annular head 59 leaving an opening around the shaft, through which a delivery chute 60 extends into the interior of the drum. The large end of the drum itself is open, but is surrounded by a receiving or collecting chamber 62. One or more series of air jets 63, 63 are disposed in a longitudinal line along and slightly removed from the periphery of the drum, the jets being inclined toward the larger and open end of the drum, and directed to throw a stream into the drum through the perforate walls thereof.

In operating the third form of apparatus, the drum is rotated at a speed between say 300 R. P. M. and 600 R. P. M., the air jets are opened, and rolled articles 17 are carried by a conveyor 64 and dumped into the chute 60 which delivers them to the interior of the rotating drum. Within the drum, the articles are subjected to unrolling forces generally similar to those hereinabove described to which is added a tumbling effect which contributes further to the random movement of the articles and which is accentuated by the presence of baffles within the drum. Under the influence of the angularly directed air streams, and also because of the slight slope of the drum walls, the articles move toward the larger or open end of the drum from which they fall into the receiving chamber 62, as before in an unrolled polished condition free of excess dusting material.

The third form of apparatus described in the immediately preceding paragraphs is generally preferred for commercial operations because of its efficient continuous operation coupled with relatively simple and inexpensive construction. Any of the forms of apparatus described, however, operate effectively to unroll the rubber articles substantially completely and may be satisfactorily used. It is apparent that other apparatus may be devised which will be adapted to subject rolled articles to unrolling forces similar to those herein described, and it is the intent to include within the scope of the appended claims all such obvious modifications not only in the apparatus but also in the procedure herein described.

I claim:

1. The method of uncompacting a longitudinally compacted hollow tubular thin rubber article closed at one end, which comprises repeatedly presenting the compacted article, while it is capable of substantial unrestricted movement, to a forceful fluid stream until the article is extended substantially to its normal uncompacted condition.

2. The method of unrolling a hollow tubular thin walled rubber article closed at one end, which has been longitudinally rolled upon itself, which comprises repeatedly presenting the rolled article together with a number of similar rolled articles, while they are capable of substantial unrestricted movement, to a forceful fluid stream until the article is extended substantially to its normal unrolled condition.

3. The method of uncompacting hollow tubular thin walled rubber articles which have been compacted longitudinally, which comprises placing a number of the compacted articles in a container having a volume several times greater than the aggregate volume of the rubber articles, directing a forceful fluid stream into the container and against the rubber articles in such direction as to effect considerable random movement of the articles within the container to present repeatedly the compacted articles to the fluid stream and to bring the articles in their random movement into intermittent frictional contact with each other and with the walls of the container, and continuing such treatment until the articles are extended substantially to their normal uncompacted condition.

4. The method of uncompacting hollow tubular thin walled rubber articles which have been compacted longitudinally, which comprises placing a number of the compacted articles in a container having a volume several times greater than the aggregate volume of the rubber articles, rotating the container and directing a forceful fluid stream into the rotating container and against the rubber articles in such direction as to impart to the articles a random movement within the container to bring them into intermittent frictional contact with each other and with the walls of the rotating container, and continuing such treatment until the articles are extended substantially to their normal uncompacted condition.

5. The method of uncompacting hollow tubular thin walled rubber articles which have been compacted longitudinally, which comprises placing a number of the compacted articles in a perforate walled container having a volume several times greater than the aggregate volume of the rubber articles, rotating the container at a sufficiently high rate of speed to hurl the articles centrifugally toward the perforate walls of the container, directing a relatively high velocity forceful fluid stream through the perforate walls into the container and against the rubber articles therein to accentuate the random movement of the articles due to the rotation of the conainer, whereby the articles are presented repeatedly to the forceful fluid stream and in their random movement are brought intermittently into frictional contact with each other and with the walls of the container, and continuing such treatment until the articles are extended substantially to their normal uncompacted condition.

6. The method of uncompacting hollow tubular thin walled rubber articles which have been compacted longitudinally, which comprises placing a number of the compacted articles in a container having a volume considerably greater than the aggregate volume of the rubber articles, directing a forceful fluid stream into the container and against the rubber articles in such direction as to effect random movement of the articles within the container to present repeatedly the compacted articles to the fluid stream and to bring the articles in their random movement into intermittent frictional contact with each other and with the walls of the container and while the articles are undergoing such treatment progressively urging them toward an end of the container, and continuing the process until the articles are extended substantially to their normal uncompacted condition and are discharged in such uncompacted condition from said end of the container.

7. Apparatus for extending longitudinally compacted tubular thin rubber articles, said apparatus comprising a container having a perforate peripheral wall, means for rotating said container about an axis substantially parallel to said peripheral wall, and a plurality of angularly directed nozzles arranged in spaced relation along the outside of said perforate peripheral wall providing means for directing a plurality of forceful fluid streams into said container while it is rotating in such manner as to urge articles within the container toward an end thereof.

8. Apparatus as defined in claim 7 in which the several nozzles are directed at an acute angle to the container wall to provide for urging articles within the container from one end thereof toward the other end by means of the angularly directed fluid streams.

9. Apparatus for extending longitudinally compacted tubular thin rubber articles, said apparatus comprising a rotatable container for holding a number of the compacted articles, means for rotating said container, and means for directing a forceful fluid stream into said container while it is rotating in such manner as to impart to the articles therein a random movement and to urge the articles toward an end of the container.

ADRIAN H. FEIKERT.